(12) United States Patent
Taylor

(10) Patent No.: US 6,772,773 B2
(45) Date of Patent: Aug. 10, 2004

(54) HEATED WHEEL/TIRE APPLICATOR FOR CAR WASHES

(76) Inventor: Timothy V. Taylor, 405 Old Pike St., Canonsburg, PA (US) 15317

(*) Notice: Subject to any disclaimer, the term of this patent is extended or adjusted under 35 U.S.C. 154(b) by 63 days.

(21) Appl. No.: 10/209,599

(22) Filed: Jul. 31, 2002

(65) Prior Publication Data
US 2004/0020519 A1 Feb. 5, 2004

(51) Int. Cl.[7] .............................. B08B 3/00; B08B 3/02; B08B 3/04; B08B 3/10
(52) U.S. Cl. ..................... 134/45; 134/56 R; 134/132; 134/198
(58) Field of Search ........................ 134/45, 132, 56 R, 134/198, 123, 105, 107, 108

(56) References Cited

U.S. PATENT DOCUMENTS

| | | | |
|---|---|---|---|
| 1,907,411 A | 5/1933 | Timoney | 15/3 |
| 2,712,320 A | 7/1955 | Schroeder et al. | 134/123 |
| 2,740,414 A | 4/1956 | Moskow | 134/57 |
| 3,108,299 A | 10/1963 | Baldwin | 15/21 |
| 3,346,895 A | 10/1967 | Consolo | 15/21 |
| 3,419,022 A | 12/1968 | Youngren, Sr. et al. | 134/45 |
| 3,602,236 A | 8/1971 | Larkin, Jr. | 134/45 |
| 3,660,159 A | 5/1972 | Larkin, Jr. | 134/32 |
| 3,679,134 A | 7/1972 | Nixon | 239/70 |

Primary Examiner—Zeinab El-Arini
(74) Attorney, Agent, or Firm—Webb Ziesenheim Logsdon Orkin & Hanson, P.C.

(57) ABSTRACT

A heated wheel/tire cleaner applicator system is used in car washes to clean wheels and tires on vehicles. The system is comprised of a cleaning solution supply system and circulating hot water system. The cleaning solution supply system pumps cleaning solution from a tank, through a pipe having an inline, flow-regulating valve, to spray nozzles on the distal flow end of the pipe. An applicator box houses the distal flow end of the pipe and a small hot water tank. The circulating hot water system maintains a constant heated water temperature in the tank. The hot water in the tank heats cleaning solution flowing in the distal flow end of the pipe by convection. A trigger device in the car wash opens and closes the valve to regulate the flow of cleaning solution through the distal flow end of the pipe and spray nozzles.

7 Claims, 3 Drawing Sheets

HEATED WHEEL/TIRE APPLICATOR FOR CAR WASHES

BACKGROUND OF THE INVENTION

1. Field of the Invention

The present invention relates generally to an automatic car wash, and more specifically, to a heated wheel and tire applicator system for cleaning wheels and tires attached to vehicles passing through an automatic car wash.

2. Description of Related Art

The unsightly build-up of road grime, dirt and brake dust on the wheels and tires of vehicles has been an ongoing dilemma for any vehicle owner. Accordingly, wheel and tire cleaning systems have been developed for use with automatic car washes and automatic tire washing systems. Generally, the prior art discloses wheel and tire cleaning systems, which are comprised of a piping system that provides for the delivery of cleaning solution through the piping system to a cleaning solution applicator apparatus, then to the wheels and tires of a vehicle.

A tire cleaning apparatus is described in U.S. Pat. No. 3,108,299 to Baldwin. The tire cleaning apparatus described therein is used to remove the protective coating on the side wall portion of a tire after the tire has been mounted on a vehicle wheel. The apparatus is used to clean the side wall of a tire mounted on a vehicle wheel prior to attachment of the tire and wheel to the vehicle. The wheel-mounted tire is placed in the apparatus, where it is exposed to a scrubbing implement, such as a brush. The scrubbing implement is attached to the end of a pipe, tube or hollow arm, which is open at its lower or distal end, to provide the means to discharge liquid between the bristles of the brush. The scrubbing implement is connected at its upper or proximal end to a hose, which is connected to an outflow pipe of a tank. The cleaning solution in the tank is heated by a heating element.

A system for metering a cleaning solution for vehicle wheels is described in U.S. Pat. No. 3,660,159 to Larkin, Jr. The system includes means for metering a cleaning solution that is applied to a vehicle wheel for cleaning purposes. The system includes electric tape on the cleaning solution delivery pipes to prevent freezing of the cleaning solution as it travels from a cleaning solution reservoir to the spray nozzles via the main and branch delivery pipes. The main and branch delivery pipes are insulated with the electric tape, all of which is enclosed in a hollow plastic tube. Alternatively, the pipes can be insulated with a heat tube that surrounds the main and branch pipes, which has disposed therein, an electrical heating oil.

Various wheel and tire cleaning systems are disclosed in the prior art. However, there remains a need for a wheel and tire cleaning solution applicator that heats the cleaning solution by means of hot water convection at the point of application of the cleaning solution in an automatic car wash system. The present invention meets this need, and it overcomes the limitations in the prior art by eliminating tire and wheel cleaning brushes and associated power packs, and it also eliminates a heated holding tank for the cleaning solution.

SUMMARY OF THE INVENTION

The present invention relates to a heated wheel and tire cleaning solution applicator system for cleaning wheels and tires on a vehicle in a car wash. The heated wheel and tire cleaning solution applicator system is used in a car wash to apply cleaning solution to the wheels and tires on a vehicle passing the applicator box. The heated wheel and tire cleaning solution applicator is comprised of a cleaning solution supply system and a circulating hot water system. The main structure of the heated wheel and tire cleaning solution applicator is an applicator box housing a small hot water tank, part of the cleaning solution piping system and spray nozzles.

The cleaning solution supply system is comprised of a cleaning solution tank, an air diaphragm pump, cleaning solution supply piping with an inline solenoid valve, and spray nozzles all in fluid communication to pump the cleaning solution through the system. The cleaning solution is a mixture of a concentrated cleaner, a commercially available alkaline cleaning solution suitable for tire and wheel cleaning, and water. A diaphragm pump is positioned inline in the cleaning solution supply system to pressurize the cleaning solution in the system. An inline solenoid valve regulates the flow of the pressurized cleaning solution in connection with a trigger device.

A portion of the circulating hot water system is located in the applicator box. The circulating hot water system is comprised of a hot water source, piping, a water pump, and a small hot water tank. Hot water is pumped through the system by a one horsepower water pump in the system. Hot water flows through the system and back through the hot water source for reheating.

The circulating hot water maintains the water in the small hot water tank at a constant temperature between 95 and 140 degrees Fahrenheit, preferably between 100 and 130 degrees Fahrenheit, and more preferably at approximately 100 degrees Fahrenheit. The circulating hot water in the small hot water tank contacts the exterior surface of the distal flow portion of the cleaning solution supply piping in the interior chamber of the small hot water tank. The hot water heats by convection the cleaning solution flowing through the distal end portion of the cleaning solution system.

It is an object of the present invention to provide a wheel and tire cleaning solution applicator system for use in an automatic car wash that implements a hot water convection heating mechanism to heat the cleaning solution at the point of application. Heating the cleaning solution at the point of application is advantageous because the heated wheel and tire cleaning solution cleans road grime and dirt as well as brake dust off of the wheels and tires more effectively than an unheated cleaning solution.

DETAILED DESCRIPTION OF THE PREFERRED EMBODIMENT

Figure 1:
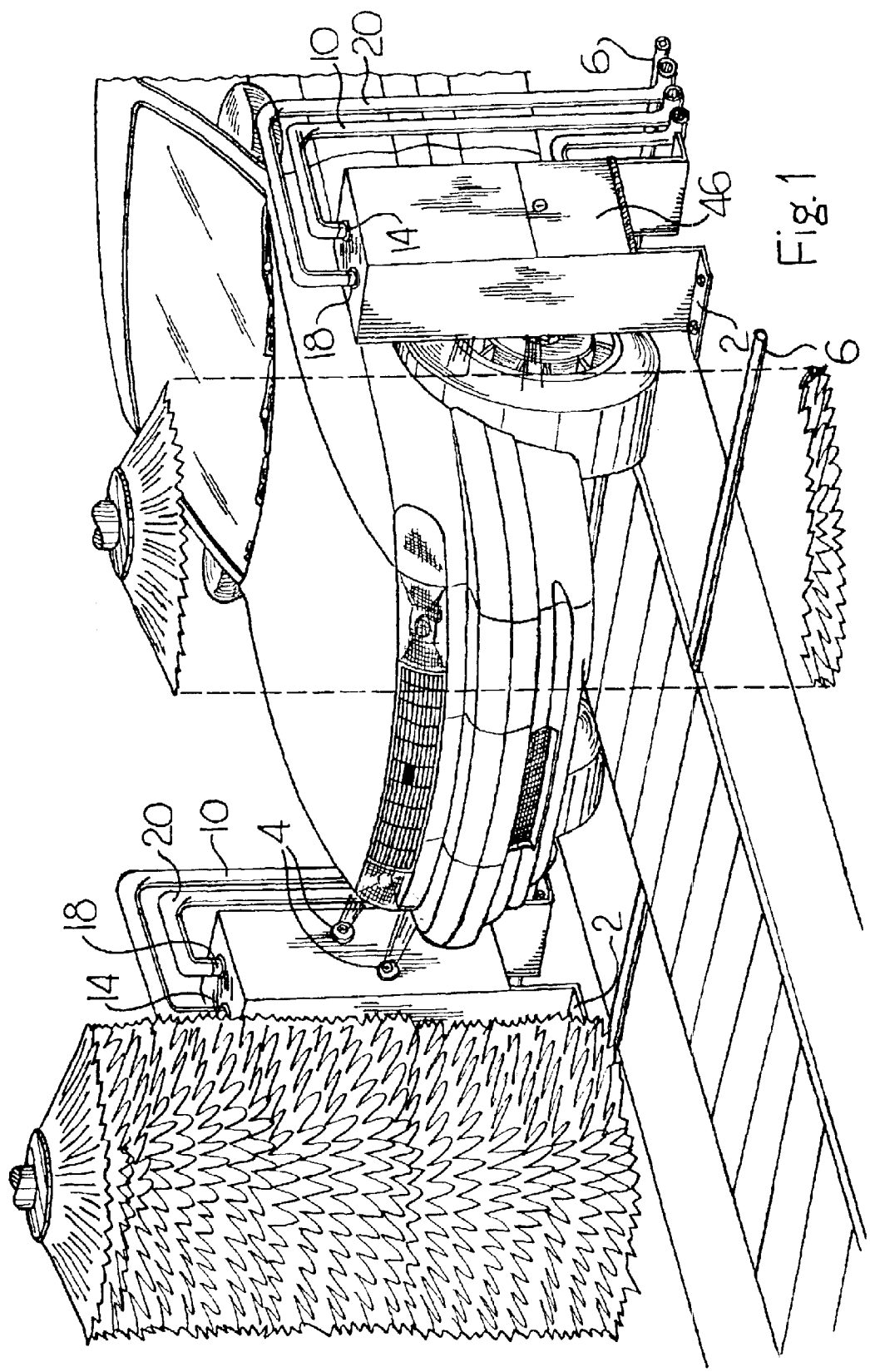
FIG. 1 illustrates a heated wheel/tire applicator according to the present invention, in an automatic car wash.
Figure 2:
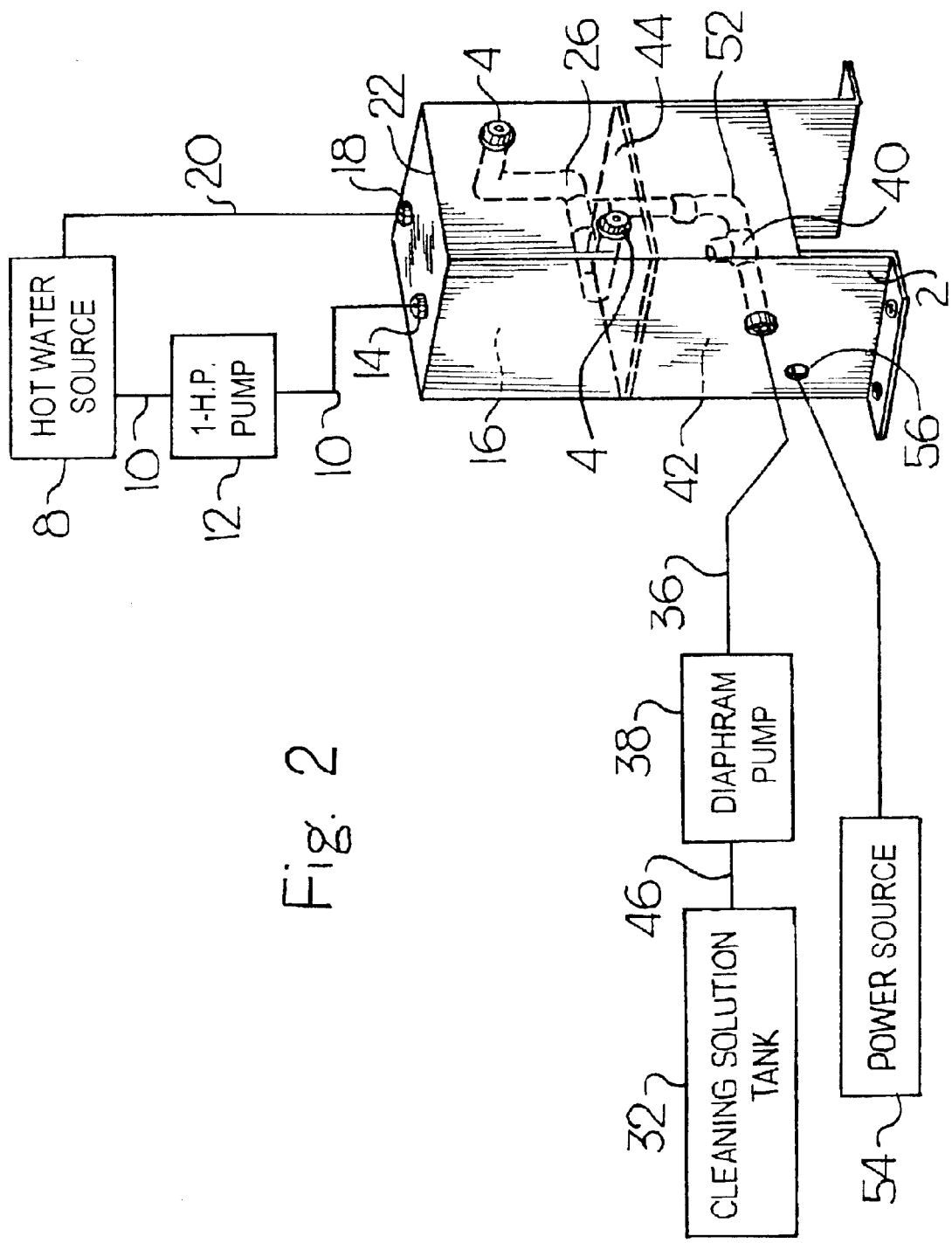
FIG. 2 is an illustrative schematic of a wheel and tire cleaning solution applicator system according to the invention.

As shown in FIG. 1, the applicator box 2 of the heated wheel and tire applicator system is positioned "on the line"

in an automatic car wash to allow the spray nozzles 4 to spray heated cleaning solution at the appropriate height onto the wheels and tires of a vehicle. As the vehicle is pulled through the car wash, the vehicle contacts a conventional trigger device 6 (FIG. 2) that activates the heated wheel and tire applicator system to spray heated cleaning solution onto the wheels and tires of the vehicle passing by the applicator box 2. The heated wheel and tire applicator system is comprised of two systems, namely, a circulating hot water system and a cleaning solution supply system, which interface in the applicator box 2, the specific parts of which are illustrated in FIG. 2. The cleaning solution supply system provides cleaning solution to the applicator box 2, and the circulating hot water system provides the heat for the cleaning solution in the applicator box 2 at the point of application.

The circulating hot water system is comprised of a temperature-controlled, hot water source 8, hot water inflow piping 10, a one horsepower water pump 12, an inflow coupling 14, a small hot water tank 16, an outflow coupling 18, and outflow piping 20 as shown schematically in FIG. 2, along with conventional temperature sensors and thermostat controls. Hot water is pumped by the one horsepower pump 12, which is inline with the inflow piping 10, from the hot water source 8 through the inflow piping 10 into the small hot water tank 16 and, then, discharged out of the hot water tank 16 by the outflow piping 20. The one horse power water pump 12 circulates hot water through the hot water system to maintain a constant water temperature in the small hot water tank 16, which is full of hot water when the circulating hot water system is functioning. The circulating hot water system is divided into three main divisions in fluid communication with each other, including the hot water inflow section, the small hot water tank 16 and the water outflow section. The circulating hot water system is sealed and self-contained. Thermocouples may be located on the small hot water tank 16 to monitor the temperature of the hot water.

The hot water source 8 is a commercially available water-heating unit with a thermostat capable of being set at a specific temperature to maintain the desired water temperature in the small hot water tank 16. The inflow piping 10 provides for the hot water to flow from the hot water source 8 into the small hot water tank 16. Specifically, one end of the inflow piping 10 is connected to the hot water source 8 and the other end is connected to the small hot water tank 16. The one horsepower water pump 12 is placed inline in the inflow piping 10 to pump hot water from the hot water source 8 through the hot water system via conventional temperature monitoring and control means. The inflow piping 10 is connected to the small hot water tank 16 by an inflow coupling 14, which provides for flow through the upper wall 22 of the small hot water tank 16.

As shown in FIGS. 2–6, the small hot water tank 16 is housed in the applicator box 2. The walls of the small hot water tank 16 define the upper compartment 24 of the applicator box 2. The small hot water tank 16 provides a reservoir for the hot water that is being pumped into the small hot water tank 16 by the one horsepower water pump 12 through the inflow piping 10. The internal portion of the small hot water tank 16 has passing through it the distal flow end 26 and part of the spray nozzles 4 of the cleaning solution supply system.

The outflow section of the circulating hot water system is comprised of an outflow coupling 18 and outflow piping 20. The outflow coupling 18 provides flow through the upper wall 22 of the small hot water tank 16, connecting the outflow piping 20 with the small hot water tank 16. The outflow piping 20 is connected to the hot water source 8.

Overall, the circulating hot water system pumps hot water from the hot water source 8 into, through, and out of the small hot water tank 16, thereby creating a heated bath at a specific, constant temperature for the distal flow end 26 of the cleaning solution supply piping 36 and part of the spray nozzles 4. The temperature-controlled hot water in the small hot water tank 16 provides for convection heating of the cleaning solution flowing through the distal flow end 26 and the spray nozzles 4 of the cleaning solution supply system. Specifically, the hot water heats the external, exposed surfaces of the distal flow end 26 and the spray nozzles 4 of the cleaning solution supply piping 36 in the small hot water tank 16. This, in turn, heats the cleaning solution flowing through the distal flow end 26 of the cleaning solution supply piping 36. Because the circulating hot water system is sealed, the hot water flowing through the small hot water tank 16 never contacts the cleaning solution flowing through the distal flow end 26 and the spray nozzles 4 of the cleaning solution supply system. Rather, heat is transferred through the piping to heat the cleaning solution.

The cleaning solution supply system is a flow-regulated, pressurized system. As shown schematically in FIG. 2, the cleaning solution system is comprised of a cleaning solution tank 32, cleaning solution supply piping 36, an air diaphragm pump 38, spray nozzles 4, applicator box 2, a solenoid valve 40, and trigger device 6. The applicator box 2 is located in a car wash so that when a vehicle passes the applicator box 2, cleaning solution is sprayed onto the wheels and tires of the vehicle (FIG. 1).

Figure 5:
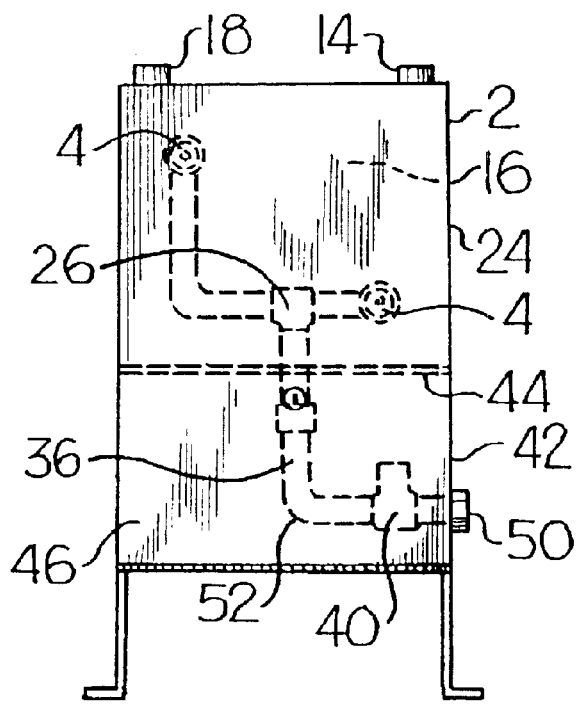
FIG. 5 is a back elevation of the applicator box of FIG. 3.
Figure 6:
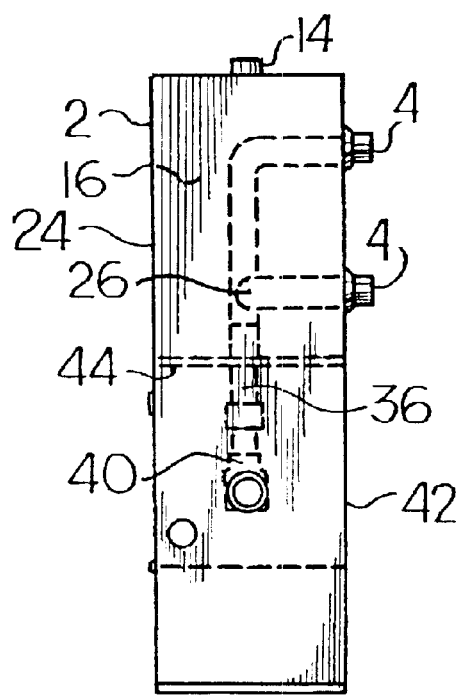
FIG. 6 is a right side elevation of the applicator box of FIG. 3.

The applicator box 2, which is the interface for the circulating hot water system and the cleaning solution supply system, is horizontally partitioned into an upper compartment 24 and a lower compartment 42 (FIGS. 2–6). The upper compartment 24 defines the small hot water tank 16 of the circulating hot water system with the distal flow end 26 of the cleaning solution supply system passing therethrough. The bottom wall 44 of the small hot water tank 16 divides the upper compartment 24 from the lower compartment 42. The lower compartment 42 of the applicator box 2 provides an open area that receives and houses the cleaning solution supply piping 36 and the solenoid valve 40. An access door 46 is located on the backside of the lower compartment 42, which provides access to the solenoid valve 40 for service (FIGS. 1 and 5).

The cleaning solution flows from the cleaning solution tank 32 through the cleaning solution supply piping 36, having an inline air diaphragm pump 38 and a solenoid valve 40, and through the distal flow end 26 of the cleaning solution supply piping 36 to the spray nozzles 4 (FIGS. 2–6). The cleaning solution used in the cleaning solution supply system is a mixture of water and a commercially available, concentrated cleaner in an effective concentration. Specifically, the cleaning solution is pumped under pressure by the air diaphragm pump 38 from the cleaning solution tank 32 through the system. The flow of the cleaning solution through the system is regulated by the solenoid valve 40, which is activated by the trigger device 6 to the open position to allow flow of the cleaning solution up to and through the spray nozzles 4 for application to the wheels and tires of a vehicle.

Figure 3:
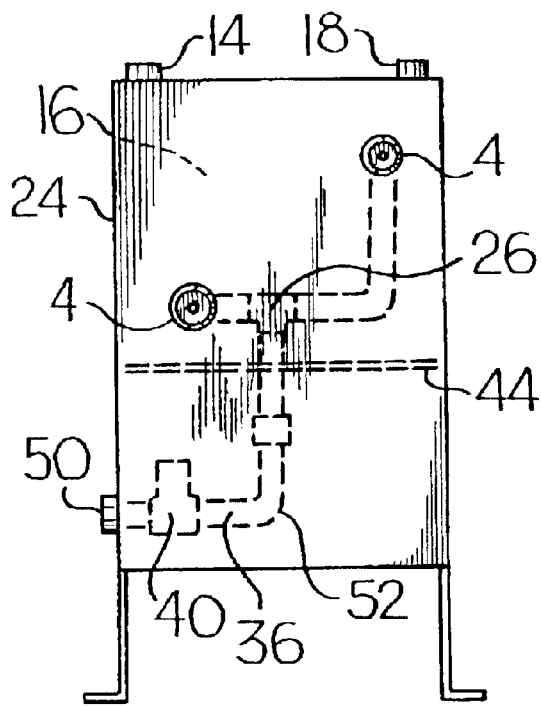
FIG. 3 is a front elevation of an applicator box with spray nozzles disposed thereon according to the invention.
Figure 4:
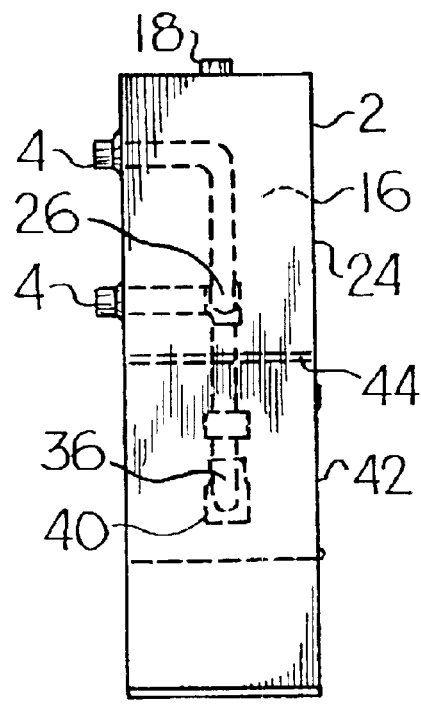
FIG. 4 is a left side elevation of the applicator box of FIG. 3.

The cleaning solution supply piping 36 passes through an inlet 50 in the side wall of the lower compartment 42 of the applicator box 2 (FIG. 3). Once inside the lower compartment 42 of the applicator box 2, the cleaning solution meets the inline flow-regulating solenoid valve 40. After passing the solenoid valve 40, the cleaning solution is redirected upward by a 90 degree elbow pipe fitting 52, through the bottom wall 44 of the small hot water tank 16 into the interior portion of the small hot water tank 16 housed in the upper compartment 24 of the applicator box 2 (FIGS. 2–6).

The distal flow end 26 of the cleaning solution supply piping 36, which is located inside of the small hot water tank 16, is bifurcated to provide flow communication to the two spray nozzles 4 (FIGS. 3–6). The cleaning solution supply piping 36 passing through the bottom wall 44 of the small hot water tank 16 is sealed to maintain the integrity of the circulating hot water system. Particularly, upper compartment 24 is filled with hot water, while lower compartment 42 is not. The two spray nozzles 4 are positioned at different heights on the front side of the applicator box 2 to maximize the spray exposure to the wheels and tires of a vehicle. The spray nozzles 4 are sealed to box 2 to prevent leakage of hot water from the hot water tank 16.

The trigger device 6 is placed in a location in the automatic car wash to allow tires of a passing vehicle to contact the trigger device 6. The trigger device 6 may be a first rubber hose and a second rubber hose that lie approximately three feet apart perpendicular to the forward directional movement of a vehicle being pulled by a conveyor through the car wash. The two rubber hoses are connected to an air switch that activates and deactivates a 24-Volt power flow from a power source 54 to the solenoid valve 40. The power source 54 is placed in a remote location and is connected to the solenoid valve 40 by wires that pass through a power source inlet 56 in the side wall of the lower compartment 42 of the applicator box 2.

As a vehicle enters an automatic car wash, the vehicle is connected to a conveyor system that pulls the car through the car wash. At which time, the closed solenoid valve 40 prevents the pressurized flow of cleaning solution to the distal flow end 26 and the spray nozzles 4 of the cleaning solution supply pipe 36. As the vehicle is pulled through the car wash, the tires of the vehicle contact the first rubber hose, thereby generating a pulse of air, which travels to an air switch. The pulse of air contacts the normally open contact in the air switch, closing the contact. The closed contact sends a power impulse to the main car wash controller where the wheel and tire relay power outflow is located. When the wheel and tire relay is energized by the power impulse from the air switch, 24-Volt AC power is sent to the solenoid valve 40. The 24-Volt AC power opens the solenoid valve 40 to allow the flow of the pressurized cleaning solution through the solenoid valve 40 and cleaning solution supply piping 36. The cleaning solution then flows to the distal flow end 26 and spray nozzles 4 of the cleaning solution supply system, and onto the wheels and tires of a vehicle. The vehicle runs over the second rubber hose, sending an air pulse to open the closed contact in the air switch. When the contact is opened, another power impulse is sent to the main car wash controller to stop the 24-Volt AC power flow to the solenoid valve 40. This, in turn, closes the solenoid valve 40, thereby stopping the flow of the cleaning solution through the cleaning solution supply system. Cleaning solution which remains in distal end 26 of supply piping 36 is then preheated in tank 16 for application to the next vehicle coming through the line.

The present invention advantageously provides an apparatus and method for cleaning the wheels and tires on a vehicle in an automatic car wash by heating the solution at the point of application and then spraying heated cleaning solution onto the wheels and tires of the vehicle.

The cleaning solution is heated to temperatures between 95° F. to 140° F. inclusive, preferably between 100° F. to 130° F., and most preferred at 100° F. Significantly improved cleaning results have been observed by the use of a prototype applicator. In addition to the improved results, heating the solution allows for use of a less concentrated cleaning solution mixture for effective results, thereby decreasing money spent in operating the system. The cleaning solution is a mixture of water to concentrated cleaner in concentrations of 2:1 to 10:1, preferably at 3:1. Finally, the components of the heated wheel/tire applicator system are preferably comprised of stainless steel and other rust-proof materials that are commercially available.

Although the invention has been described with reference to this preferred embodiment, other embodiments can achieve the same result. Variations and modifications of the present invention will be apparent to those skilled in the art, and the following claims are intended to cover all such modifications and equivalents.

I claim:

1. A vehicle wheel and tire cleaning apparatus for use in an automatic car wash line, comprising:

an applicator box housing a hot water tank;

cleaning solution supply piping passing through the hot water tank;

the cleaning solution supply piping having at least one spray nozzle connected thereto;

a flow control valve inline with the cleaning solution supply piping; and the applicator box being positionable on the automatic car wash line.

2. The vehicle wheel and tire cleaning apparatus of claim 1, wherein the applicator box is comprised of an upper compartment and a lower compartment, the upper compartment defining the hot water tank, the lower compartment defining an open space containing cleaning solution supply piping and the flow control valve, with an access door on the lower compartment.

3. The vehicle wheel and tire cleaning apparatus of claim 1, wherein the hot water tank has connected thereto a hot water inflow pipe with an inline water pump, and a water outflow pipe, with a hot water source connected in circuit with the inflow pipe and the outflow pipe.

4. The vehicle wheel and tire cleaning apparatus of claim 1, wherein the cleaning solution supply piping has connected thereto a cleaning solution tank, a solenoid valve, a bifurcated pipe and at least two spray nozzles, with an inline air diaphragm pump placed between the cleaning solution tank and the solenoid valve.

5. The vehicle wheel and tire cleaning apparatus of claim 1, wherein a portion of the cleaning solution supply piping, just upstream of the at least one spray nozzle, passes through the hot water tank.

6. The vehicle wheel and tire cleaning apparatus of claim 1 further comprising a triggering mechanism for opening and closing the flow control valve.

7. A tire and wheel applicator for use on an automatic car wash line, comprising:

an applicator box;

a hot water system comprised of a hot water source, piping, a water pump and a hot water tank; and a cleaning solution supply system comprised of spray nozzles, piping, a solenoid valve with triggering device, a diaphragm pump, a cleaning solution tank, and cleaning solution;

a distal end of the piping in the cleaning solution supply system being positioned in the hot water tank;

wherein the applicator box defines the hot water tank, and the applicator box is positioned adjacent to the spray nozzles, on the automatic car wash line.

* * * * *